United States Patent [19]

Coteus et al.

[11] Patent Number: 5,537,476
[45] Date of Patent: Jul. 16, 1996

[54] SECURE VIEWING OF DISPLAY UNITS BY IMAGE SUPERPOSITION AND WAVELENGTH SEPARATION

[75] Inventors: Paul W. Coteus, Yorktown Heights, N.Y.; Douglas S. Goodman, Sudbury, Mass.

[73] Assignee: International Business Machines Corporation, Armonk, N.Y.

[21] Appl. No.: 342,514

[22] Filed: Nov. 21, 1994

[51] Int. Cl.⁶ .................. G09C 5/00; H04L 9/00
[52] U.S. Cl. .................. 380/54; 380/6; 380/59; 348/42; 359/462; 359/466
[58] Field of Search .............. 380/6, 7, 54, 59; 359/462, 464, 466; 348/42, 44, 46–51, 54, 60

[56] References Cited

U.S. PATENT DOCUMENTS

| | | | |
|---|---|---|---|
| 1,658,439 | 2/1928 | Hammond | 359/466 X |
| 2,338,298 | 1/1944 | Overhage | 359/464 |
| 2,832,821 | 4/1958 | Du Mont | 348/835 |
| 3,621,127 | 11/1971 | Hope | 348/56 |
| 3,969,830 | 7/1976 | Grasham | 380/54 |
| 3,991,266 | 11/1976 | Baer | 348/385 |
| 4,424,529 | 1/1984 | Roese et al. | 348/56 |
| 4,772,944 | 9/1988 | Yoshimura | 348/56 |
| 4,859,994 | 8/1989 | Zola et al. | 345/9 |
| 4,879,603 | 11/1989 | Berman | 348/832 |
| 4,881,179 | 11/1989 | Vincent | 395/113 |
| 5,107,443 | 4/1992 | Smith et al. | 395/158 |

*Primary Examiner*—Bernarr E. Gregory
*Attorney, Agent, or Firm*—Scully, Scott, Murphy & Presser

[57] ABSTRACT

Apparatus for masking a displayed image by mixing the image with a secondary image that is electronically generated to be related to the primary image that when combined with the primary image obscures viewing of the primary image. The primary image is generated in the form of a first set of wavelength bands and the secondary image is a second set of related wavelength bands. A filter is provided to absorb the second set of wavelength bands to permit secure viewing of the primary image.

11 Claims, 2 Drawing Sheets

OVERLAPPED IMAGES

SECURE VIEWING OF DISPLAY UNITS BY IMAGE SUPERPOSITION AND WAVELENGTH SEPARATION

RELATED APPLICATIONS

The present invention is related to commonly assigned U.S. patent applications having Ser. Nos. 08/342,950 and 08/342,953 filed Nov. 24, 1994, entitled SECURE VIEWING OF DISPLAY UNITS USING AN ELECTRONIC SHUTTER and SECURE VIEWING OF DISPLAY UNITS USING A WAVELENGTH FILTER, respectively, which have identity of inventorship and which are incorporated herein by reference.

BACKGROUND OF THE INVENTION b 1. Field of the Invention

The present invention is directed to video display security systems and more particularly to a system for optically masking a display image and selective removal of the mask for secure viewing of the display.

2. Discussion of the Prior Art

The widespread use of laptop computers has enabled users to access information in also any location. Often, information is retrieved during meetings or while traveling between destinations where many other people besides the user may view the display. A problem arises where the information displayed is confidential and should be seen only by the user.

While information security systems that provide various levels of security to multiple users on a network, such as that shown in U.S. Pat. No. 4,881,179, provide selected access to information, these systems do not protect unauthorized viewing of the information while it is being displayed. U.S. Pat. No. 4,859,994 is directed to a system for providing selected viewing of a display to allow hearing impaired persons to view subtitles while others cannot see the subtitles. A liquid crystal display that produces the subtitles as polarized light can be seen only by viewers having polarized eyeglass lenses. Although selective viewing is provided, it is not secure viewing in that anyone having polarized sunglasses can see the information on the screen. In addition, the selectivity is not switchable in the event security is no longer required.

Thus, there is a need for a system for providing secure, selective viewing of information on a display that can be easily enabled and disabled by the viewer.

SUMMARY OF THE INVENTION

The present invention is directed to an apparatus for providing secure viewing of a primary image on a display by a viewer that includes means for generating the primary image formed from a first set of wavelength bands, means for generating a related image formed from a second set of wavelength bands, and viewing means for separating the related image from the primary image. The primary and related images combine to form a composite image that masks the primary image. The viewing means is for use only by one intended to see the primary image and thus the composite image only allows the primary image to be viewed through the viewing means. The viewing means is comprised of a wavelength filter adapted to absorb the second set of wavelength bands while passing the first set of wavelength bands. The present invention applies to personal computers, video display units, personal data assistants or any other means of display using emitted light to allow viewing of confidential information in a public place.

DETAILED DESCRIPTION OF THE INVENTION

Figure 1:
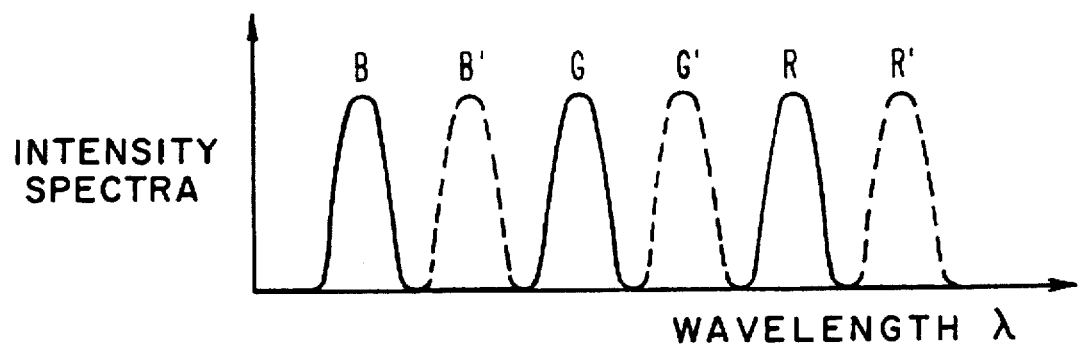
FIG. 1 is a wavelength versus intensity spectra showing both the primary and secondary wavelength bands.

The present invention is directed to an apparatus for providing secure viewing of a primary image on display by a viewer by combining the primary image which is formed of a first set of wavelengths and a secondary image which is formed of a second complementary set of wavelengths wherein the combination of the primary and secondary images masks the primary image. The secondary complementary set of wavelengths must be separate from and not substantially overlap the first set of wavelengths. FIG. 1 shows an example of a first set of wavelength bands represented by a spectrum of blue, green and red light used to form the primary image and designated B, R and G in the figure. It is important that the spectrum of the primary image be a narrow, adequately separated set of wavelength bands. The second set of wavelength bands, R', B' and G', in the example of FIG. 1, do not substantially overlap the first and span approximately the color space of the first set of wavelength bands. The second set of wavelength bands produces a secondary image that masks the primary image. In a preferred embodiment of the present invention, the secondary image is related to the first image in that the three color bands that define it are related in an appropriate manner to the three color bands of the first image by, for example, being wavelength shifted. One way of generating the secondary image is to form the secondary image from the primary image by subtracting, for each pixel of the display, the intensity of each of the three colors of the primary image, from a constant which exceeds the maximum intensity of any pixel. These values can be used to define the secondary image which is displayed along with the primary image on a common screen. In this example, the composite image would be formed as the pixel by pixel display of the sum of R+R', G+G' and B+B', which would all be equal. Thus, a featureless image would be formed. Alternatively, two images could be formed with information in both, but when combined the information of either image is obscured, for example, in the case of text where each image can be in a different language.

Figure 2:
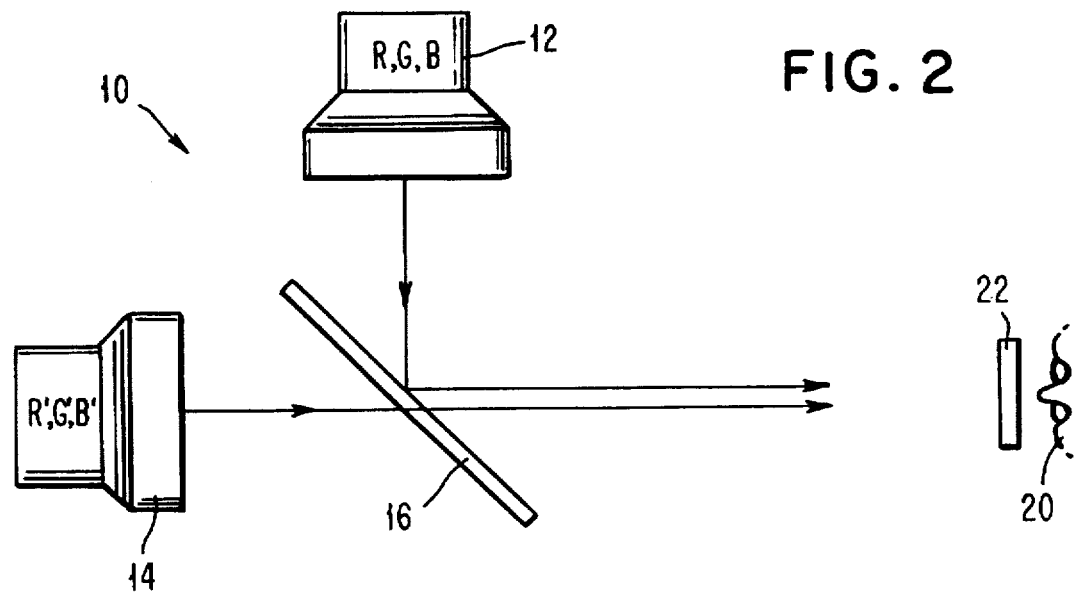
FIG. 2 is a schematic of one apparatus for secure viewing of a display in accordance with the present invention.

FIG. 2 shows an apparatus 10 of one embodiment for providing secure viewing in accordance with the present invention. The apparatus 10 includes a first display 12 for providing the primary image and a second display 14 for providing the second related image. One of the images, in this case the secondary image, passes through a beam splitter 16. The other image, in this example the primary image, is reflected off the beam splitter 16 and combines with the secondary image to provide a composite image. Although the figure shows the primary image being reflected off the beam splitter and the secondary image passing through the beam splitter, these displays may be reversed. The apparatus 10 can be provided by a single display capable of generating all the wavelengths for both the primary and secondary images, instead of the two separate displays 12 and 14. In the single display embodiment, the means for combining the images is also provided within the display.

In order to view the primary image, the user 20 must use an absorption filter 22 capable of absorbing the second set of wavelength bands while passing the first set of wavelength bands. Since wavelength bands of the first and second images are narrow and essentially non-overlapping, a filter that allows the spectral transmission of the first wavelength band, but blocks the second wavelength band will permit the primary image to be viewed. The filter can be implemented, for example, in a pair of eyeglasses or a clip-on filter covering a pair of eyeglasses.

Figure 3:
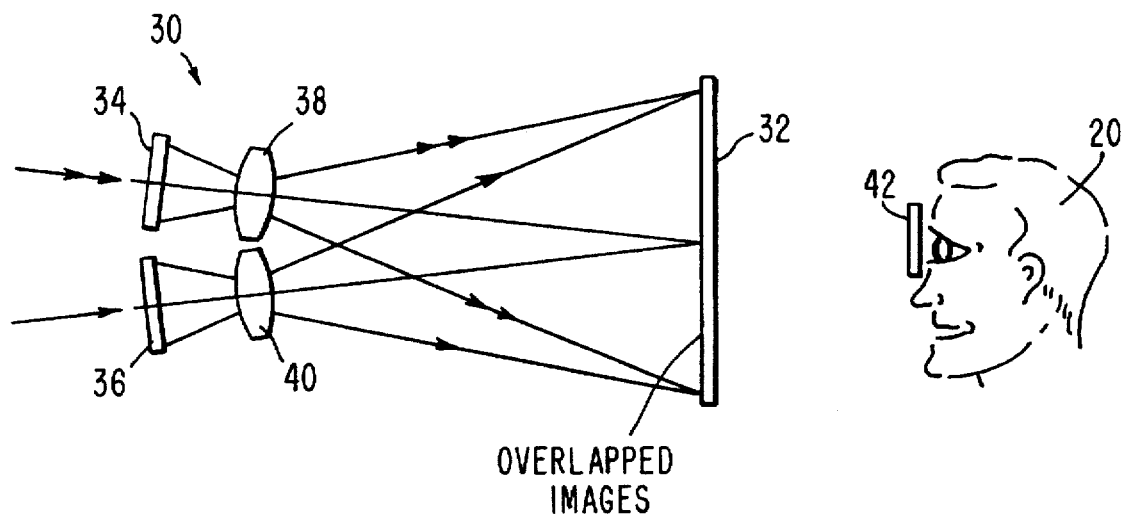
FIG. 3 is a schematic of a second apparatus for the secure viewing of a display in accordance with the present invention.

FIG. 3 is a schematic of a second embodiment of the present invention. As shown, the apparatus 30 projects two images into the rear of a display screen 32. A pair of image generating means 34 and 36 generate the primary and secondary images. Lenses 38 and 40 project the primary and secondary images so that they overlap onto the rear of the screen 32. This embodiment is particularly useful for flat panel display screens in which the means 34 and 36 would be, for example, active matrix displays. Filter 42 is provided to separate the primary and secondary image. Filter 42 can be provided to block either the primary or secondary image so that selective viewing of the images can be obtained.

In accordance with the present invention, a viewer who does not have the filter means with a wavelength absorption band matching the secondary image will see a highly distorted image. Secure viewing is achieved by allowing the desired image to be seen only with the proper filter. In addition, the masking of the primary image is switchable so that if security is not desired the secondary image can be switched off to allow anyone to see the undistorted primary image. The switching capability is easily provided by simply turning off the display generating the secondary image.

Figure 4:
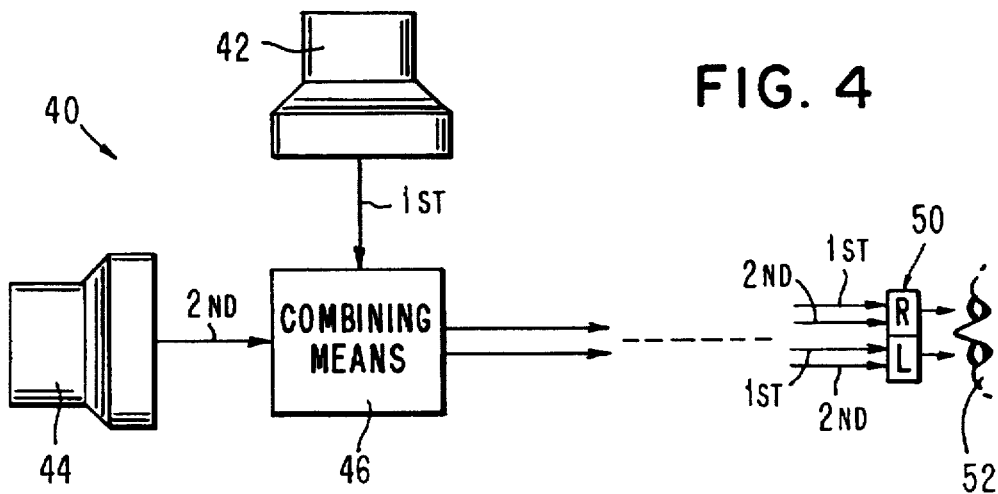
FIG. 4 is a schematic of an apparatus for viewing a stereo image in accordance with the present invention.

FIG. 4 shows another embodiment of the present invention for producing stereo images. In this embodiment, apparatus 40 includes a first means 42 that generates a first view of an image in a first set of wavelengths. A second means 44 generates a second view of the image in a second related set of wavelengths. The first and second views are combined by means 46 using one of the methods described in connection with FIGS. 2 and 3 above or other appropriate method. Filter 50 is comprised of separate filter components for each eye of the viewer in which the left eye filter blocks the first view of the image and the right eye filter blocks the second view of the image. Viewer 52 will then see the image in "3D"-like stereo.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described the invention, what is claimed as new and desired to be secured by Letters Patent is:

1. An apparatus for providing secure viewing of a primary image on a display by a viewer comprising:

means for generating a primary image formed from a first set of wavelength bands;

means for generating a secondary image formed from a second and different set of wavelength bands, wherein the second set of wavelengths is determined as a function of the first set;

means for combining the primary and secondary images to form a composite image that masks the primary image; and viewing means for use by said viewer which blocks the second wavelength band for separating said secondary image from said composite image to allow the primary image to be viewed only through said viewing means.

2. The apparatus of claim 1 wherein said means for combining the primary and secondary images includes a beam splitter.

3. The apparatus of claim 1 wherein said primary and secondary images are rear projected onto substantially the same area of a display screen.

4. The apparatus of claim 1 wherein said viewing means includes a wavelength filter adapted to absorb said secondary image and transmit said primary image.

5. The apparatus of claim 4 wherein the primary and secondary wavelength bands are sufficiently separated such that absorption of said secondary image does not substantially distort the primary image passed by the filter.

6. The apparatus of claim 4 wherein said filter is comprised of eyeglass lenses to be worn by the viewer.

7. The apparatus of claim 6 wherein said lenses are adapted to clip onto clear lens eyeglasses.

8. The apparatus of claim 1 wherein said primary image is formed of first red, green and blue frequency bands and said secondary image is formed of second red, green and blue frequency bands separate from said first frequency bands.

9. The apparatus of claim 1 further including a single display means for generating all of the wavelengths for both the primary and secondary images, said single display means further including said combining means.

10. The apparatus of claim 1 further including means for generating the secondary image by wavelength shifting the primary image.

11. An apparatus for generating a stereo image comprising:

a first means for generating a first view of an image in a first set for wavelengths;

a second means for generating a second view of said image in a second set of wavelengths, wherein said second set of wavelengths is determined as a function of the first set;

means for continuously combining the first and second views by superposition to form a third, composite, image; and viewing means for use by a viewer of the composite image for continuously blocking the first set of wavelengths to one eye, therein permitting only the second image to be seen by said one eye, and blocking the second set of wavelengths to the other eye of said viewer, therein permitting only the first image to be seen by said other eye.

\* \* \* \* \*

UNITED STATES PATENT AND TRADEMARK OFFICE
CERTIFICATE OF CORRECTION

PATENT NO. : 5,537,476
DATED : July 16, 1996
INVENTOR(S) : Paul W. Coteus

It is certified that error appears in the above-identified patent and that said Letters Patent is hereby corrected as shown below:

Column 1, line 17: delete "b"

Signed and Sealed this

Tenth Day of June, 1997

Attest:

BRUCE LEHMAN

*Attesting Officer*  *Commissioner of Patents and Trademarks*